United States Patent [19]

Chung et al.

[11] Patent Number: 5,155,179

[45] Date of Patent: Oct. 13, 1992

[54] MISCIBLE BLENDS OF POLYIMIDE POLYMERS

[75] Inventors: Tai-Shung Chung, Randolph; Edward R. Kafchinski, Winfield, both of N.J.

[73] Assignee: Hoechst Celanese Corp., Somerville, N.J.

[21] Appl. No.: 514,917

[22] Filed: Apr. 25, 1990

[51] Int. Cl.⁵ .............................................. C08L 79/08
[52] U.S. Cl. ...................................... 525/432; 525/436
[58] Field of Search ................................. 525/432, 436

[56] References Cited

U.S. PATENT DOCUMENTS

| 3,505,168 | 4/1970 | Dunphy et al. | 525/432 |
| 4,107,125 | 8/1978 | Lovejoy et al. | 525/432 |
| 4,913,759 | 8/1990 | Wright et al. | 156/238 |
| 4,954,578 | 9/1990 | Ree et al. | 525/432 |
| 5,055,116 | 10/1991 | Kohn et al. | 55/16 |

Primary Examiner—Ana L. Carrillo
Attorney, Agent, or Firm—Joseph M. Mazzarese

[57] ABSTRACT

Novel polyimide blends are formed of polyimide polymers each having moieties derived from dianhydride and diamine comonomers. The miscible blends of the present invention may be formed by selecting polyimide polymers having structurally different dianhydride-derived moieties, as well as structurally different diamine-derived moieties. More specifically, the blends of this invention include at least one polyimide polymer which is a reaction product of 2,2-bis(3,4-dicarboxyphenyl) hexafluoropropane dianhydride, and 2,2-bis(3-aminophenyl) hexafluoropropane; and at least another polyimide polymer which is a reaction product of 2,2-bis(4-aminophenyl) hexafluoropropane and a dianhydride which is at least one selected from the group consisting of pyromellitic dianhydride, bis(3,4-dicarboxyphenyl) ether dianhydride, and 3,3',4,4'-benzophenone tetracarboxylic dianhydride.

23 Claims, No Drawings

MISCIBLE BLENDS OF POLYIMIDE POLYMERS

FIELD OF THE INVENTION

The present invention generally relates to miscible blends of polymers. More specifically, the present invention relates to miscible blends of at least two polymides having moieties respectively derived from certain dihydrides and diamines. The miscible blends of the present invention are particularly characterized by being formed of at least two polyimides (of a specific class of polyimides to be described below) having different dianhydride-derived moieties, and different diamine-derived moieties.

BACKGROUND AND SUMMARY OF THE INVENTION

Polymer miscibility is inherently unpredictable. That is, for any given set of polymers, the underlying assumption has traditionally been that an immiscible blend will result. Thus, to discover sets of polymers that form miscible blends is typically viewed as being the exception, and not the rule.

The present invention therefore relates to miscible blends of two or more polyimides from a class of polyimide polymers having repeating units derived from certain dianhydride and diamine comonomers. According to the present invention, it has been found that miscible blends of such polyimide polymers will result even though the polyimide polymers utilized in the blend have structurally different dianhydride-derived moieties as well as structurally different diamine-derived moieties.

The miscible blends of the present invention may be usefully employed in end use applications requiring the physical properties of polyimides (e.g., as fabricated parts used in high temperature environments). In addition, the polyimide blends of this invention may be usefully employed to form membranes (e.g., in fiber or film form) used to copending U.S. Pat. application Ser. No. 505,099, now U.S. Pat. No. 5,055,116 filed in the names of Rachel S. KOHN et. al., on Apr. 3, 1990, and entitled "Gas Separation Membranes Comprising Miscible Blends of Polyimide Polymers", the entire content of which is expressly incorporated herein by reference.

DETAILED DESCRIPTION OF THE PREFERRED EXEMPLARY EMBODIMENTS

The class of polyimides that form miscible blends of the present invention are generally characterized by having a molecular structure with recurring units (exclusive of any end cap units) of the formula:

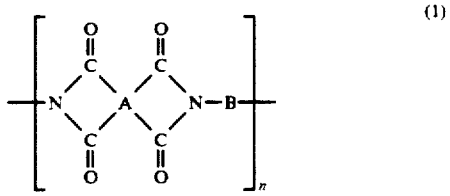

wherein the A moiety is a tetravalent aromatic radical containing at least one benzene, naphthalene or polyphenyl nucleus, the B moiety is a divalent aromatic group, and n is an integer ranging from about 15 to about 300.

More specifically, the class of polyimides that form miscible blends of the present invention are characterized by having a molecular structure with recurring units (exclusive of any end cap units) of one of the following formulas:

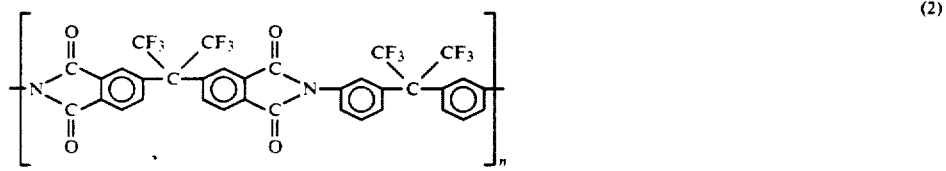

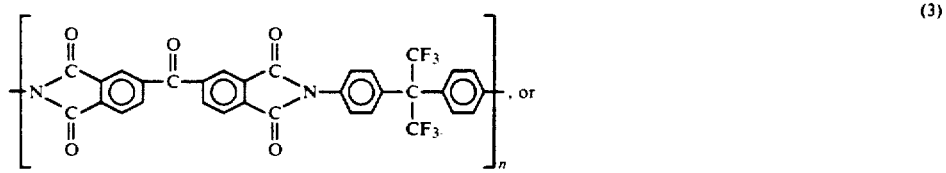

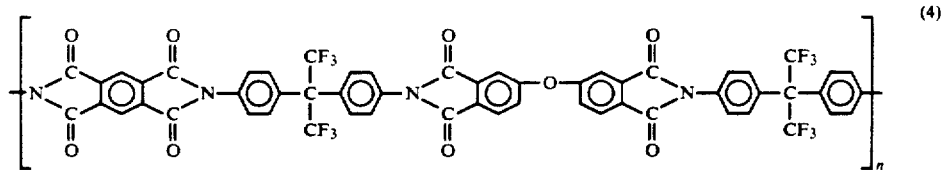

wherein n is an integer ranging from about 15 to about 300, and n is a number sufficient to provide a polyimide inherent viscosity within the range of about 0.05 to about 4.00 dL/g as measured from a solution of the polymer in dimethylacetamide at 25° C. at a polymer concentration of 0.5 weight percent.

The polyimides of the above general formulas are typically prepared in a two-step process in which a dianhydride and a diamine are first reacted to yield a polyamic acid. The polyamic acid is then converted to a polyimide in a second step.

It will therefore be observe that the dianhydride-derived and diamine-derived moieties in the above structural formulas are joined to one another through the nitrogen atom, the latter being contributed by the diamine comonomer.

It has thus been found, according to the present invention, that miscible blends of two or more polyimides having a molecular structure of one of the general formulas (2), (3), or (4) above may be formed, provided that the blend contains at least one polyimide having the formula (2) and at least a second polyimide having either the formula (3) or the formula (4). As one skilled in art will appreciate, both the dianhydride-derived and the diamine-derived moieties in formula (2) are different than the dianhydride-derived and different that the dianhydride-derived and diamine-derived moieties in formulas (3) and ((4). Notwithstanding these structural dissimilarities between the dianhydride-derived moieties and diamine-derived moieties of the respective polyimides (i.e., a polyimide having formula (2) versus a polyimide having formula (3) or (4)), miscible blends of the respective polyimides ensue.

The polyimides of the present invention are prepared by reacting an aromatic diamine and an aromatic dianhydride. For a polyimide having the structure of formula (2), the diamine employed is 2,2-bis(3-aminophenyl) hexafluoropropane, and the dianhydride employed is 2,2-bis(3,4-dicarboxyphenyl) hexafluoropropane dianhydride. For a polyimide having the structure of formula (3), the diamine employed is 2,2-bis(4-aminophenyl) hexafluoropropane, and the dianhydride employed is 3,3',4,4'-benzophenone tetracarboxylic dianhydride. For a polyimide having the structure of formula (4), the diamine employed is 2,2-bis(4-aminophenyl) hexafluoropropane, and the dianhydride is pyromellitic dianhydride and bis-(3,4-dicarboxyphenyl) ether dianhydride preferably in a 50/50 weight percent ratio).

Thus, the polyimides of the present invention are prepared by reacting 2,2-bis(3-aminophenyl) hexafluoropropane and 2,2-bis(3,4-dicarboxyphenyl) hexafluoropropane dianhydride; 2,2-bis(4-aminophenyl) hexafluoropropane and 3,3',4,4'-benzophenone tetracarboxylic dianhydride; or 2,2-bis(4-aminophenyl) hexafluoropropane and pyromellitic dianhydride and bis(3,4-dicarboxyphenyl) ether dianhydride to yield polyimides having recurring groups of the formulas (2), (3), and (4), respectively. To prepare the polyimides having recurring groups of the formula (4), preferably a 50/50 weight percent ratio of pyromellitic dianhydride and bis(3,4-dicarboxyphenyl) ether dianhydride is used.

As will be appreciated by one of ordinary skill in the art, the polyimides formed from the dianhydrides and diamines illustrated in specific embodiments of the present invention can be copolymerized with each other or, for example, with other polyimides formed from aromatic dianhydrides and aromatic diamines. As used herein, polyimide is defined as a polymer or copolymer.

The dianhydrides used in accordance with the present invention are preferably substantially analytically pure, for example, "electronic" grade dianhydride is preferred. This grade of material contains more than 98.5% dianhydride, less than 1.5% of the corresponding monoanhydride-diacid and less than 0.1% of the corresponding tetra-acid. The 2,2-bis(3,4-dicarboxyphenyl) hexafluoropropane dianhydride (sometimes referred to herein as "6FDA") is commercially available from Hoechst Celanese Corporation, Route 202-206 North, Somerville, N. J. 08876. Electronic grade dianhydride contains less than 10 ppm sodium, less than 5 ppm iron, less than 2 ppm cobalt, and less than 2 ppm manganese, and has a melting point of 246.5 degrees Celsius.

The diamines utilized in accordance with the present invention are also preferably substantially analytically pure. For example, to obtain the preferred purity of the diamines noted hereinafter, an available grade or synthesized grade of 2,2-bis(4-aminophenyl) hexafluoropropane or 2,2-bis(3-aminophenyl) hexafluoropropane may be dissolved in aqueous hydrochloric acid and treated with activated charcoal, stirred for thirty minutes and filtered. The treatment is repeated as necessary to remove color impurities. The aqueous solution obtained after repeated filtering is treated with ammonium hydroxide until the pH of the resulting slurry is about 9. The diamine slurry is then filtered and washed with de-ionized or distilled water to form a filter cake, which in turn is redissolved in methanol and clarified through a five micron or smaller filter. Subsequently, diamine is precipitated from the methanol solution by the addition of distilled or de-ionized water and washed, also with water. The moist diamine is dried overnight in a vacuum oven and contains less than 10 ppm iron, sodium and chloride ions. Further information concerning diamines may be found in copending U.S. Pat. application Ser. No. 105,857 filed Oct. 7, 1987, in the name and entitled "A Process for Bis(4-aminophenyl) hexafluoropropane," the entire disclosure of which is incorporated herein by reference.

The solvents which may be used in the polymerization process are organic solvents, preferably anhydrous, whose functional groups do not react with either the dianhydride or diamine reactant to any appreciable extent, and in which either the dianhydride or diamine, preferably both, are soluble. Examples of suitable solvents include N,N-dialkylcarboxylamide solvents such as N,N-dimethylformamide or N,N-dimethylacetamide; N-methyl-2-pyrrolidone; gamma-butyrolactone; pyridine; diglyme; and like materials as well as mixtures of such solvents.

In general, the polyimides forming the miscible blends of this invention have a weight average molecular weight within the preferred range of from about 25,000 up to about 400,000, and more preferably from about 50,000 up to about 280,000.

In the preferred process for preparing the polyimides that may be used to form the miscible blends of this invention, approximately equimolar quantities of a dianhydride and a diamine are utilized in accordance with the process described in copending U.S. Pat. application Ser. No. 217,929 filed July 12, 1988 in the names of R. Vora et. al., the entire disclosure of which is incorporated herein by reference. In general, this process involves the polycondensation of a diamine and a dianhydride followed by the dehydration of the resulting polyamic acid to form a polyimide.

Preferably, the diamine is first dissolved in a polymerization solvent medium and the dianhydride (e.g., including dianhydrides which can be premixed) is then gradually added portion wise under continuous agitation. After the addition of all of the monomer, the concentration of the reactants should be such that a solution concentration within the range of about 10 to about 30% by weight (preferably about 20% by weight) is achieved. Additional solvent may be added if necessary to achieve this level.

Polymerization is then conducted under anhydrous conditions while agitating the mixture maintained by a cooling bath at a temperature of less than about 35° C., preferably from about 20° C. to about 30° C. Polymerization is conducted for a time sufficient to form a polyamic acid having the desired molecular weight, usually a period of from about 8 to about 20 hours. The polyamic acid may then be converted to the polyimide by one of several techniques known in the art, for example, by heating the polyamic acid solution until imidization is substantially complete, or by combining the polyamic acid solution and a dehydrating agent, with or without catalyst, and optionally heating the resulting mixture until imidization is complete. The polyimide may then be recovered from solution by precipitation with alcohol (e.g., methanol) and washed with additional alcohol.

The resulting polyimides may then be blended in accordance with the present invention using conventional solution blending technology to yield a blend having specifically tailored properties. For example, the solid polyimides to be blended may be dissolved in a common solvent (e.g., methylene chloride) and in a common vessel under vigorous stirring. In the event that the solution is cloudy, hexafluoroisopropanol may be added dropwise until a clear solution is obtained. Thereafter, the solution may be filtered and subsequently degassed by subjecting the solution to a vacuum. Solids precipitation (e.g., in methanol) will then yield the solution-blended polyimides.

The preferred polyimides utilized in the present invention are miscible with one another at various polymer blend ratios, as evidenced by a single glass transition temperature (Tg°C.) which is between the highest and lowest glass transition temperatures attributable to respective individual polymer components employed in the blend. As used herein (and in the accompanying claims), the term "miscible" is intended to refer to a polymer blend (which comprises multiple polymer components) that exhibits a single glass transition temperature (Tg°C.) as measured by standard differential scanning calorimetry (DSC) techniques after the blend has been heated to a temperature above the highest glass transition temperature attributable to a respective individual polymer component comprising the blend, and subsequently cooled.

The invention will be further illustrated by reference to the following non-limiting Examples.

EXAMPLES

A. Synthesis Procedure

Several polyimides were prepared using the following synthesis procedure. The selected diamine monomer and freshly distilled N-methyl pyrrolidone (NMP) were added to a three neck flask fitted with a stirrer, condenser, ice water bath, and thermometer under a nitrogen atmosphere. The mixture was agitated for several minutes at room temperature to yield a clear, slightly yellow solution, which was then cooled to below room temperature (about 15° C.). The dianhydride monomer was then added portion-wise to the cooled solution in equal intervals and amounts over a period of about thirty minutes. The addition of the dianhydride monomer was carefully executed while the reaction mixture was agitated gently so that the solution was maintained between 15° C. and 25° C.

Following the addition of the dianhydride, the individual beakers that contained the diamine and dianhydride monomers were washed with an additional amount of NMP to remove residual amounts of monomer therein. The NMP and residual monomer was then added to the reaction mixture to obtain a solution of about twenty percent nonvolatile concentration. The mixture, maintained at a uniform temperature between about 25° C. and 30° C., was agitated gently for about 16 hours to form polyamic acid. Beta-picoline was then added and fully dispersed in the polymerization mixture. Thereafter, acetic anhydride was added dropwise, with the resulting mixture being agitated gently for an additional 21 hours (also at a uniform temperature of between 25° C. to 30° C.) to complete cyclization.

The resulting polymer was precipitated from solution in methanol by the addition of methanol to the reaction liquor, using 2000 ml. of methanol for every 500 g of polymeric solution. The resulting polymer was then washed with additional fresh methanol and dried.

B Monomer Nomenclature

In the polyimide examples below, the following monomer nomenclature has been used:

Dianhydrides

6FDS—2,2-bis(3,4-dicarboxyphenyl) hexafluoropropane dianhydride

BTDA—3,3',4,4'-benzophenone tetracarboxylic dianhydride

ODPA—bis(3,4-dicarboxyphenyl) ether dianhydride

PMDA—pyromellitic dianhydride

Diamines 3,3'-6FDAM—2,2-bis(3-aminophenyl) hexafluoropropane diamine 4,4'-6FDAM—2,2-bis(4-aminophenyl) hexafluoropropane diamine

C. Polymer Preparation

Using the synthesis procedures described above in Section A, several polyimides were prepared using the dianhydride and diamine comonomers identified below:

Polyimide No. 1: 6FDA and 3,3'-6FDAM

Polyimide No. 2: ODPA/PMDA (50:50 weight ratio) and 4,4'-6FDAM

Polyimide No. 3: BTDA and 4,4'-6FDAM

Polyimide No. 4: 6FDA and 4,4'-6FDAM

D. Preparation of Polyimide Blends

Various weight percent blends were prepared from the above-identified polyimides as noted below in Table 1. Sample Nos. 2-6 comprise blends of Polyimide Nos. 1 and 2, while Sample Nos. 9-12 comprise blends of Polyimide Nos. 1 and 3, in the various weight percentages noted in Table 1.

It will be observed that each of the polyimides in the sample blends (i.e., Sample Nos. 2-6 and 9-12) had structurally different dianhydride-derived moieties (i.e., since different dianhydride monomers were employed), and had structurally different diamine-derived moieties (i.e., since different diamine monomers were employed).

Blending of the polyimides was accomplished by adding the individual polyimides in a weight ratio of 1:1 to a common solvent (e.g., methylene chloride) in the same vessel under stirring conditions. The polyimides were added to an amount of solvent so that the total solids concentration was between 3-5% by weight. If the solution was cloudy, hexafluoroisopropanol was added dropwise until a clear solution was obtained. The solution was then filtered through a 0.2 micron Teflon ® PTFE filter and subsequently degassed by subjecting the solution to a vacuum. The polyimide blend solution was then precipitated in methanol and dried under vacuum at 70° C. for a few hours or overnight.

Miscible polyimide blends were also prepared from the above-identified polyimides as noted below in Table 2. Blending of the polyimides was accomplished in the same manner as noted above, except the weight ratio of the three individual polyimides was 1:1:1.

E. Glass Transition Temperature Measurements

The glass transition temperature (Tg°C.) for each of the polyimide blend samples noted below was obtained by subjecting the samples to a du Pont 910 differential scanning calorimeter (DSC), in a nitrogen atmosphere. The samples were each heated at a rate of 20° C. per minute to 400° C., cooled to room temperature and then subjected to a second heating cycle at a rate of 20° C. per minute. The glass transition temperature was measured during the second heating cycle. Table 1 and Table 2 below show the glass transition temperature data that was obtained for each noted sample.

TABLE 1

| Sample No. | Wt. % of Polyimide No. 1 | Wt. % of Polyimide No. 2 | Wt. % of Polyimide No. 3 | Tg of Blend (deg. C.) |
|---|---|---|---|---|
| 1 | 0 | 100 | — | 347.57 |
| 2 | 18.1 | 81.9 | — | 314.5 |
| 3 | 39.6 | 60.4 | — | 291 |
| 4 | 50 | 50 | — | 282 |
| 5 | 72.3 | 27.7 | — | 265 |
| 6 | 86.7 | 13.3 | — | 260 |
| 7 | 100 | 0 | — | 250.5 |
| 8 | 0 | — | 100 | 304 |
| 9 | 18.3 | — | 81.7 | 298.5 |
| 10 | 50 | — | 50 | 261 |
| 11 | 67.5 | — | 32.5 | 258 |
| 12 | 87 | — | 13 | 253 |
| 13 | 100 | — | 0 | 250.5 |

It will be observed from the glass transition temperature data in Table 1 that each sample noted above formed a miscible blend of the two polyimide components (as evidenced by a single glass transition temperature that was numerically between the glass transition temperature attributable to each individual component), even though the components had different diamine-derived moieties and different dianhydride-derived moieties. Thus, by selecting those polyimides as described above, miscible blends may be formed even though the polyimides in the blend have structurally different diamine-derived moieties and structurally different dianhydride-derived moieties. Thus, the resulting physical properties, for example, of such polyimide blends may be tailored to suit particular end-use applications.

TABLE 2

| Sample No. | Wt. % of Poly. No. 1 | Wt. % of Poly. No. 2 | Wt. % of Poly. No. 3 | Wt. % of Poly. No. 4 | Tg of Blend (deg. C.) |
|---|---|---|---|---|---|
| 14 | 33.3 | 33.3 | — | 33.3 | 287 |
| 15 | 33.3 | — | 33.3 | 33.3 | 280 |

It will be observed from the glass transition temperature data in Table 2 that Sample Nos. 14 and 15 formed a miscible blend of the three polyimide components (as evidenced by a single glass transition temperature), even though two of the components had different diamine-derived moieties and different dianhydride-derived moieties. Thus, by selecting those polyimides as described above, miscible blends may be formed even though at least two polyimides in the blend have structurally different diamine-derived moieties and structurally different dianhydride-derived moieties. Accordingly, the resulting physical properties, for example, of such polyimide blends may be tailored to suit particular end-use applications.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A miscible blend of at least two polyimide polymers having different molecular structures comprising:
    (a) a first polyimide polymer which is a reaction product of 2,2-bis(3,4-dicarboxyphenyl) hexafluoropropane dianhydride, and 2,2-bis(3-aminophenyl) hexafluoropropane; and
    (b) a second polyimide polymer which is a reaction product of (i) a dianhydride which is at least one selected from the group consisting of pyromellitic dianhydride, bis(3,4-dicarboxyphenyl) ether dianhydride, and 3,3',4,4'-benzophenone tetracarboxylic dianhydride; and (ii) 2,2-bis-(4-aminophenyl) hexafluoropropane.

2. The miscible blend of claim 1, wherein the second polyimide polymer (b) is a reaction product of 3,3',4,4'-benzophenone tetracarboxylic dianhydride and 2,2-bis(4-aminophenyl) hexafluoropropane.

3. The miscible blend of claim 1, wherein the second polyimide polymer (b) is a reaction product of a dianhydride consisting essentially of pyromellitic dianhydride and bis(3,4-dicarboxyphenyl), ether dianhydride; and 2,2-bis(4-aminophenyl) hexafluoropropane.

4. The miscible blend of claim 3, wherein the second polyimide polymer (b) is a reaction product of a dianhydride consisting essentially of about 50 weight percent pyromellitic dianhydride and about 50 weight percent bis(3,4-dicarboxyphenyl) ether dianhydride; and 2,2-bis(4-aminophenyl) hexafluoropropane.

5. The miscible blend of claim 1, wherein at least one polyimide polymer has a weight average molecular weight within the range of from about 25,000 up to about 400,000.

6. The miscible blend of claim 1, wherein at least one polyimide polymer has a weight average molecular weight within the range of from about 50,000 up to about 280,000.

7. The miscible blend of claim 1, wherein at least polyimide polymers (a) and (b) each have a weight average molecular weight within the range of from about 25,000 up to about 400,000.

8. The miscible blend of claim 1, which further comprises a polyimide which is a reaction product of 2,2-bis(3,4-dicarboxyphenyl) hexafluoropropane dianhydride, and 2,2-bis- (4-aminophenyl) hexafluoropropane.

9. A miscible blend comprising at least two polyimide polymers, each of said at least two polyimide polymers being reaction products of (i) at least one diamine selected from the group consisting of 2,2-bis(3-aminophenyl) hexafluoropropane, and 2,2-bis(4-aminophenyl) hexafluoropropane, and (ii) at least one dianhydride selected from the group consisting of 2,2-bis(3,4-dicarboxyphenyl) hexafluoropropane dianhydride, pyromellitic dianhydride, bis(3,4-dicarboxyphenyl) ether dianhydride, and 3,3',4,4'-benzophenone tetracarboxylic dianhydride, provided that each of said at least two polyimide polymers are reaction products of different diamines and different dianhydrides.

10. The miscible blend of claim 9, wherein one of said at least two polyimide polymers is a reaction product of 2,2-bis(4-aminophenyl) hexafluoropropane and 3,3',4,4'-benzophenone tetracarboxylic dianhydride.

11. The miscible blend of claim 9, wherein one of said at least two polyimide polymers is a reaction product of 2,2-bis(4-aminophenyl) hexafluoropropane and a dianhydride consisting essentially of pyromellitic dianhydride and bis(3,4-dicarboxyphenyl) ether dianhydride.

12. The miscible blend of claim 9, wherein one of said at least two polyimide polymers is a reaction product of 2,2-bis(3-aminophenyl) hexafluoropropane and 2,2-bis(3,4-dicarboxyphenyl) hexafluoropropane dianhydride.

13. The miscible blend of claim 9, which further comprises a polyimide which is a reaction product of 2,2-bis(3,4-dicarboxyphenyl) hexafluoropropane dianhydride, and 2,2-bis-(4-aminophenyl) hexafluoropropane.

14. A method for forming a miscible blend of polyimide polymers comprising the steps of:

selecting at least two polyimide polymers having different molecular structures, wherein one of said at least two polyimide polymers is a reaction product of 2,2-bis(3,4-dicarboxyphenyl) hexafluoropropane dianhydride, and 2,2-bis(3-aminophenyl) hexafluoropropane; and one of said at least two polyimide polymers is a reaction product of (i) a dianhydride which is at least one selected from the group consisting of pyromellitic dianhydride, bis(3,4-dicarboxyphenyl) ether dianhydride, and 3,3',4,4'-benzophenone tetracarboxylic dianhydride; and (ii) 2,2-bis(4-aminophenyl) hexafluoropropane, said method further comprising forming a miscible blend of said at least two polyimide polymers.

15. The method as in claim 14, wherein said step of forming said miscible blend of said polyimide polymers includes forming a solution of said at least two polyimide polymers in a common solvent, and then precipitating a blend of said at least two polyimide polymers from said common solvent.

16. The method as in claim 14, wherein said step of forming said miscible blend of said polyimide polymers includes forming a solution of said at least two polyimide polymers in a common solvent comprising methylene chloride.

17. The method as in claim 14, wherein one of said at least two polyimide polymers is a reaction product of 3,3',4,4'-benzophenone tetracarboxylic dianhydride, and 2,2-bis(4-aminophenyl) hexafluoropropane.

18. The method as in claim 14, wherein one of said at least two polyimide polymers is a reaction product of (i) a dianhydride consisting essentially of pyromellitic dianhydride and bis(3,4-dicarboxyphenyl) ether dianhydride, and (ii) 2,2-bis(4-aminophenyl) hexafluoropropane.

19. The method as in claim 14, wherein one of said at least two polyimide polymers is a reaction product of (i) a dianhydride consisting essentially of about 50 weight percent pyromellitic dianhydride and about 50 weight percent bis(3,4-dicarboxyphenyl) ether dianhydride, and (ii) 2,2-bis(4-aminophenyl) hexafluoropropane.

20. The method as in claim 14, wherein at least one polyimide polymer has a weight average molecular weight within the range of from about 25,000 up to about 400,000.

21. The method as in claim 14, wherein at least one polyimide polymer has a weight average molecular weight within the range of from about 50,000 up to about 280,000.

22. The method as in claim 14, wherein each of said at least two polyimide polymers has a weight average molecular weight within the range of from about 25,000 up to about 400,000.

23. The method as in claim 14 wherein the selecting step includes selecting an additional polyimide which is a reaction product of 2,2-bis(3,4-dicarboxyphenyl) hexafluoropropane dianhydride and 2,2-bis(4-aminophenyl) hexafluoropropane; and wherein the forming step includes forming a miscible blend of said at least two polyimide polymers and said additional polyimide.

* * * * *